United States Patent [19]
Hiraoka et al.

[11] Patent Number: 5,490,259
[45] Date of Patent: Feb. 6, 1996

[54] LOGICAL-TO-REAL ADDRESS TRANSLATION BASED ON SELECTIVE USE OF FIRST AND SECOND TLBS

[75] Inventors: Tohru Hiraoka; Hiromichi Kainoh; Akira Yamaoka, all of Hadano, Japan

[73] Assignees: Hitachi, Ltd.; Hitachi Microcomputer System Ltd., both of Tokyo, Japan

[21] Appl. No.: 93,969

[22] Filed: Jul. 21, 1993

[30] Foreign Application Priority Data

Jul. 22, 1992 [JP] Japan ................................. 4-195502

[51] Int. Cl.$^6$ ..................................................... G06F 12/10
[52] U.S. Cl. ..................................... 395/412; 364/DIG. 1; 395/417
[58] Field of Search ..................................... 395/400, 425

[56] References Cited

U.S. PATENT DOCUMENTS 5,148,538  9/1992  Celtruda et al. ....................... 395/425

*Primary Examiner*—Michael A. Whitfield
*Attorney, Agent, or Firm*—Antonelli, Terry, Stout & Kraus

[57] ABSTRACT

Under such a condition between outputs of AND circuits for outputting All "0" when one of zero detecting circuits of two register identifiers within an instruction register detects "0", instead of a content of a general-purpose register designated by these identifiers, and also a carry derived from a page offset corresponding to an intermediate result of an address adder, when a page address portion of a logical address is known before this logical address is defined, selecting circuits are controlled, and then the address controller is bypassed to retrieve a translation look-aside buffer, thereby defining a real address. In case that the page address portion of the logical address register is identical to the page address portion of the base register, the translation look-aside buffer is previously retrieved in accordance with either the content of the index register, or the content of the base register so that the real address can be defined.

13 Claims, 4 Drawing Sheets

LOGICAL-TO-REAL ADDRESS TRANSLATION BASED ON SELECTIVE USE OF FIRST AND SECOND TLBS

BACKGROUND OF THE INVENTION

The present invention generally relates to an information processing apparatus improving a memory access. More specifically, the present invention is directed to an information processing apparatus capable of quickly defining a real address used to retrieve a cache memory, which is translated by a translation look-aside buffer from a logical address obtained by employing a general-purpose register from an instruction, capable of retrieving the cache memory at an earlier stage, and capable of continuing a process of the instruction at a high efficiency.

U.S. Pat. No. 5,148,538 issued to Celtruda et al., discloses a logical address/real address translation to access a cache memory.

FIG. 1 is a schematic block diagram for representing one example of an information processing apparatus which has been designed by the Applicants during a process approaching to the present invention. In FIG. 1, reference numeral 110 indicates an instruction register containing an index register identifier 101, a base register identifier 102, and displacement bits 103; reference numeral 120 represents a large number of general-purpose registers (will be referred to "GPR" hereinafter) usable as an index register and a base register; reference numeral 130 shows an address adder for generating a logical address having a page address portion and a page offset portion based upon a content 221 of an index register, a content 222 of a base register, and the displacement bits 103; and reference numeral 140 denotes a logical address register for storing a logical address obtained by the address adder 130. Furthermore, reference numeral 140 shows a logical address register for storing a logical address obtained by the address adder 130; reference numeral 150 is a translation look-aside buffer (will be referred to "TLB" hereinafter) for selecting a real address corresponding to a logical address from the logical address register 140; reference numeral 160 indicates a real address register for storing a page address portion of the real address obtained from the TLB 150 and a page offset portion from the logical address register 140; reference numeral 170 denotes a cache memory apparatus for retrieving storage data based on the real address from the real address register 160 and for supplying the data to a requesting apparatus; reference numeral 171 shows a cache memory; reference numeral 172 represents a cache directory for judging whether or not data demanded by an instruction is present; and reference numeral 180 indicates an arithmetic and logical unit (will be called as "ALU" hereinafter).

A process of an instruction such as a register data load instruction as shown in FIG. 2 with employment of a memory operand will be performed as follows:

First, a machine cycle for decoding an instruction is performed.

In FIG. 2, assuming now that symbol "OP" indicates "LOAD", in case that it is required to load operands designated by $X_2/B_2/D_2$ to R1, an instruction stored in the instruction register 110 is decoded, an identifier 101 of this index register X2 and an identifier 102 of a base register B2 are transferred to the GPR 120 respectively. The GPR 120 is arranged by, for instance, 16 general-purpose register groups, to which identification numbers defined from 0 to 15 have been allocated. The GPR 120 selects the general-purpose register having the identification number corresponding to the index register identifier 101, and transfers the content of this selected general-purpose register to the address adder 130 as a content 221 of the index register. Also, the GPR 120 selects the general-purpose register having the identification number corresponding to the base register identification 102, and transfers the content of this selected general-purpose register as a content 222 of the base register to the address adder 130.

In this case, when a 0th general-purpose register is designated as the numbers for the index register and the base register, data of an all-zero output is transferred to the address adder 130 irrelevant to the content of the 0th general-purpose register.

In the subsequent machine cycle of the logical address generation, the address adder 130 adds the content 221 of the index register, the content 222 of the base register, and the displacement bit 103, as illustrated in FIG. 3, to obtain the logical address, and then a process for storing this value into the logical address register 140 is executed.

During the next TLB retrieval machine cycle, the following process is executed.

The TLB 150 is retrieved under such a condition that the page address portion of the logical address register 140 is used as a key, and then the TLB 150 transfers the page address portion of the real address corresponding to this logical address to the real address register 160. Thereafter, both of the page address portion of the real address from the TLB 150, and the page offset portion from the logical address register 140 are stored into the real address register 160.

It should be noted that since a detailed description about the retrieval of the TLB 150 is not directly related to the technical spirit and scope of the present invention, further explanation is omitted.

The below-mentioned process will now be executed in the machine cycle for the next cache memory retrieving operation.

The cache memory apparatus 170 retrieves a cache directory 172 by way of the real address derived from the real address register 160, and judges whether or not the data demanded by the instruction is present in the cache memory 171. If the data is not located within the cache memory 171, the cache memory apparatus 170 does not directly retrieve the data from the cache memory 171, and transfers the demanded data to another independent mechanism in which this demanded data is retrieved. To the contrary, if there is the demanded data in the cache memory 171, then the cache memory apparatus 170 retrieves the data from the cache memory 171 based upon the real address, and transfers the data demanded by the instruction to the ALU 180.

In the next machine cycle of the calculation execution, the ALU 180 performs the calculation based upon the data which has been transferred from the cache memory apparatus 170.

To achieve a quick definition of the real address required for retrieving the cache memory apparatus, it is necessary to reconsider such a problem. That is to say, 3 machine cycles are continuously required to store an instruction into the instruction register, to decode the instruction, to generate the logical address, to access the TLB, and then to define the real address required for reading out the memory operand demanded by this instruction.

SUMMARY OF THE INVENTION

An object of the present invention is to solve the above-described problems of the prior disadvantaged information processing apparatus, and to provide such an information processing apparatus capable of quickly defining a real address required for accessing a cache memory apparatus, whereby a high-speed information process can be realized.

Another object of the present invention is to provide such an information processing apparatus that when a page address portion of a logical address is previously known before defining a logical address register, a translation look-aside buffer (TLB) is accessed in a machine cycle identical to a machine cycle required for an address addition.

In accordance with the present invention, the above-described object can be achieved by that a selecting apparatus is provided for selecting a content of a page address of a logical address register after an addition effected by an address adder, a content of an index register before the addition effected by the address adder, or a content of a page address of a base register, when the page address of the logical address is identical to the page address of the index register, the TLB is previously accessed based on the content of the index register, and when the page address of the logical address is identical to the page address of the base register, the TLB is previously accessed based upon the content of the base register.

Furthermore, the above-described object of the present invention is achieved in that there are provided a second TLB for supplying a real address corresponding to the next page address of the selection result of the selecting unit independent of a first TLB for supplying a real address corresponding to the selection result of the selecting unit, and such a control is performed by a selection controlling circuit 194 such that when a page address of a logical address is identical to a page address of a base register, the first TLB is previously accessed based upon a content of a base register, when the page address of the logical address is identical to the page address of the index register, the first TLB is previously retrieved based upon the content of the index register, furthermore, when the page address of the logical address is identical to the next page address of the page address of the base register, the second TLB is previously accessed based upon the content of the base register, and when the page address of the logical address is identical to the next page address of the index register, the second TLB is previously retrieved based upon the content of the index register.

As a consequence, according to the present invention, since the TLB can be previously retrieved even when the next page address of the content of the base register, or the index register is identical to the page address of the logical address, the real address required for retrieving the cache memory apparatus can be quickly determined.

In addition, the above-described object can be achieved by comprising a selecting apparatus for selecting one of a page offset of an address addition result and a page offset of a logical address register, whereby the address adding process and the TLB retrieving process can be separately performed.

In accordance with the present invention, even when the above-described TLB retrieving process A/T corresponding to the logical address of the instruction cannot be performed in order that the content of the index register must be added to the content of the base register, the address adding process of the subsequent instruction can be simultaneously performed with the TLB retrieval T for the present instruction, and the real address required for retrieving the cache memory unit can be defined at an earlier stage.

In the information processing apparatus according to the present invention, when an instruction using a memory operand is decoded, both an index register identifier and a base register identifier are transferred to a general-purpose register. The general-purpose register transfers contents of registers corresponding to the index register identifier and the base register identifier to a logical address generating apparatus as the content of the index register and the content of the base register. The logical address generating apparatus obtains a logical address of a memory operand based upon the content of the index register, the content of the base register, and the displacement bits contained in an instruction, and stores the obtained logical address to a logical address storage apparatus.

On the other hand, the selecting apparatus selects the page address portion of the index register when the page address portion of the logical address is equal to the page address portion of the index register, selects the page address portion of the base register when the page address portion of the logical address is equal to the page address portion of the base register, and selects the page address portion of the logical address storage apparatus when the page address portion of the logical address is equal neither to the page address portion of the index register, nor the page address portion of the base register until the logical address has been defined within the logical address storage apparatus. The TLB is accessed based upon the selection result made by this selecting apparatus, and as a consequence, the real address corresponding to the logical address of the memory operand can be obtained.

As previously stated, in accordance with the present invention, there is no erroneous operation, since when the page address portion of the logical address is previously known, the logical address generating apparatus is bypassed and the TLB is retrieved in the logical address generation machine cycle, and when the page address portion of the logical address is not previously known, after the logical address has been defined in the logical address storage apparatus, namely the TLB is retrieved in the machine cycle subsequent to the logical address generation machine cycle.

DETAILED DESCRIPTION OF THE PREFERRED EMBODIMENTS

Referring now to drawings, an information processing apparatus according to a preferred embodiment of the present invention will be described.

Figure 1:
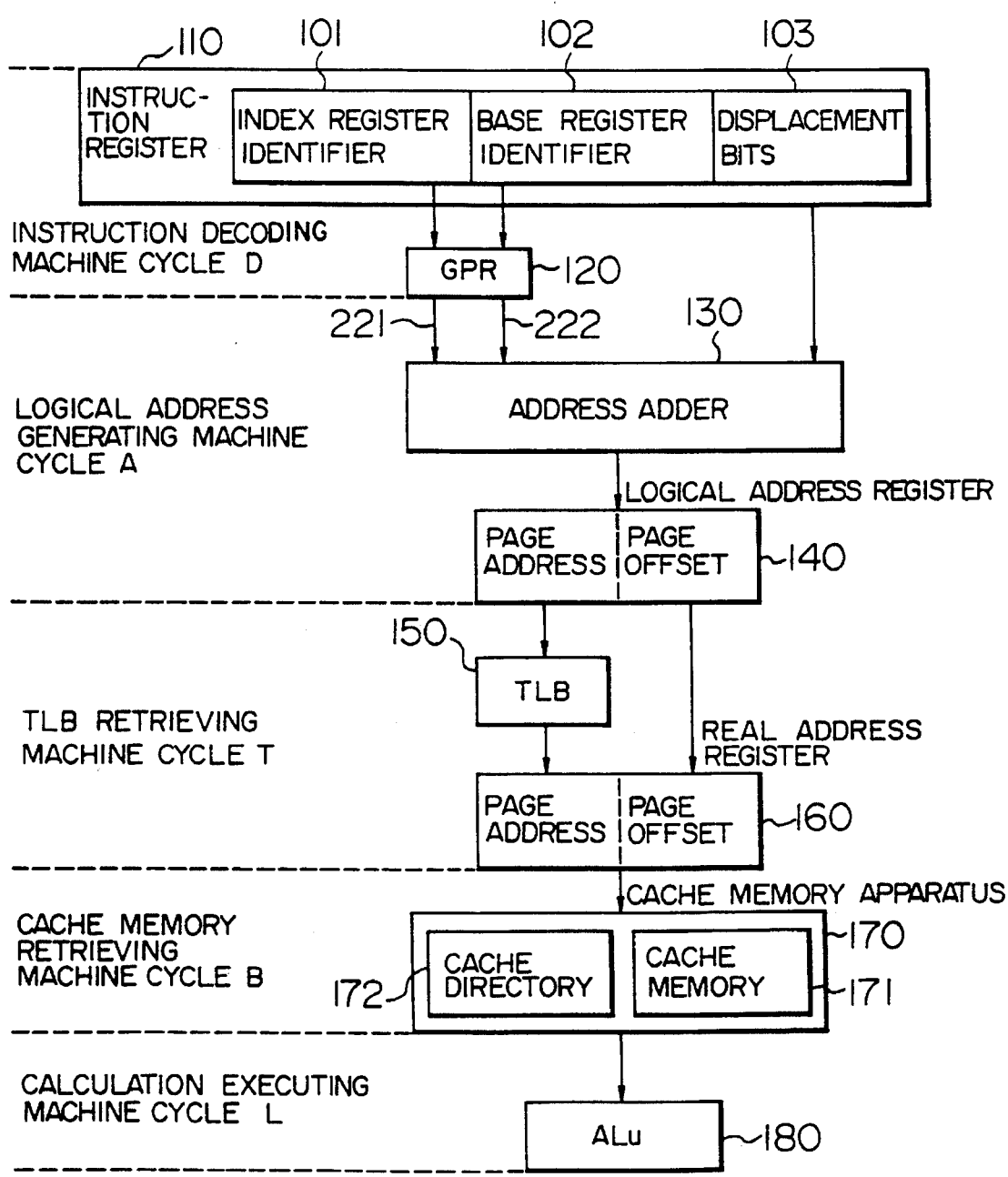
FIG. 1 is a schematic block diagram for representing a concept for a structure of an apparatus realized in a process approached to the present invention.
Figure 2:
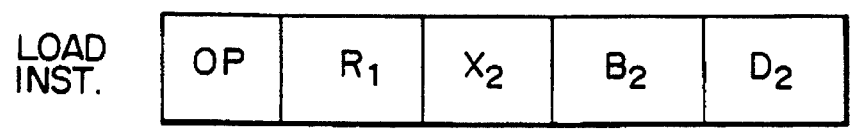
FIG. 2 illustrates an instruction containing an index register, a base register, an identifier, and a displacement bit in an operand.
Figure 3:
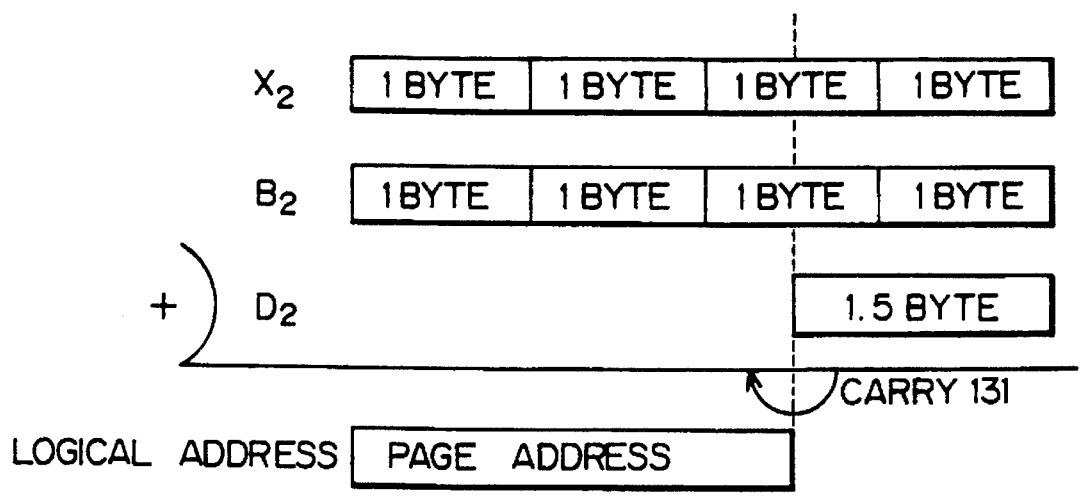
FIG. 3 is an explanatory diagram for explaining a carry when the respective contents of the registers corresponding to the index register, base register, and identifier are added to the displacement bits.
Figure 4:
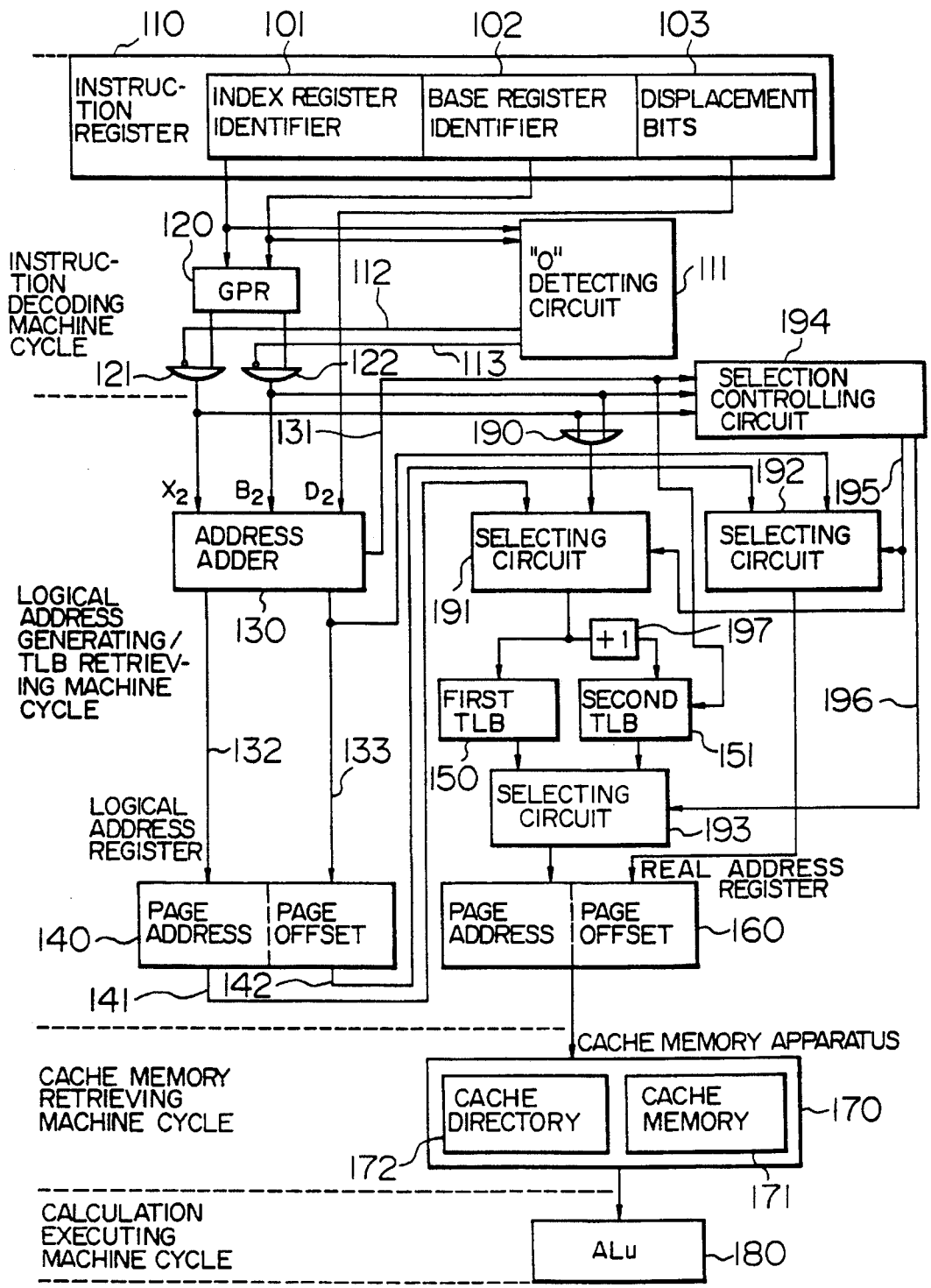
FIG. 4 schematically shows an arrangement of an information processing apparatus according to a first preferred embodiment of the present invention.
Figure 5:
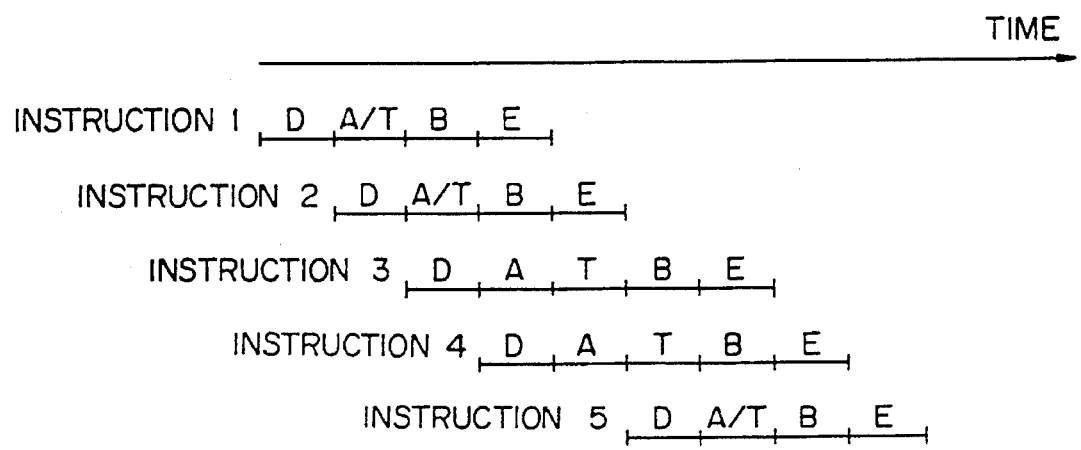
FIG. 5 is a timing chart for representing a flow of a series of instruction given to the information processing apparatus according to the present invention.

FIG. 4 schematically shows an arrangement of the information processing apparatus according to one preferred embodiment of the present invention. FIG. 5 is an explanatory diagram for explaining a flow of an instruction. In the arrangement of the information processing apparatus shown in FIG. 4, reference numeral 111 indicates a zero (0) detecting circuit, reference numerals 121 and 122 denote AND circuits, reference numeral 151 shows a second TLB (Translation Lookaside Buffer), reference numeral 190 represents an OR circuit, reference numerals 191 to 193 are selecting circuits, reference numeral 194 indicates a selection controlling circuit, and reference numeral 197 shows a +1 adding circuit. It should be noted that other reference numerals are identical to those of FIG. 1, and also the same TLB 150 shown in FIG. 1 will be referred to a "first TLB 150" in the following description. Furthermore, it should be understood that blocks of FIG. 4 having the same reference numerals as those of FIG. 1 own the same functions.

The information processing apparatus according to one preferred embodiment of the present invention is comprised of the zero detecting circuit 111 for detecting that both of an index register identifier 101 and a base register identifier 102 become "0" (zero), AND circuits 121 and 122 for applying an all-zero output in response to a control signal 112 which becomes an ON-state when the index register identifier 101 is "0", and a control signal 113 which becomes an ON-state when the base register identifier 102 is "0", irrelevant to the content of the general purpose register 120 designated by the index register identifier 101 and the base register identifier 102, and an OR circuit 190 for ORing a page address portion of an output from the AND circuit 121 and another page address portion of an output from the AND circuit 122. This information processing circuit further includes a selecting circuit 191 for selecting one of outputs derived from a page address 141 and the OR circuit 190, a selecting circuit 192 for selecting one of a page offset 142 and a page offset 133, and an adding circuit 197 for adding +1 to the page address derived from the selecting circuit 191, a second TLB 151 for selecting a page address portion of a real address corresponding to the page address derived from this adding circuit 197, and a selecting circuit 193 for selecting one of the output from the first TLB 150 and the output from the second TLB 151. Also, this information processing apparatus furthermore comprises a selection controlling circuit 194 for controlling the selecting circuits 191, 192, 193 based upon the page address portion of the output from the AND circuit 121, the output page address portion of the AND circuit 122, and a carry 131 from the page offset corresponding to an intermediate result of an address adder 130.

Then, in the information processing apparatus with the above-described construction according to one preferred embodiment of the present invention, a description will now be made of an operation for executing a process of an instruction using a memory operand.

First, a machine cycle of instruction decoding is executed.

An instruction which has been stored in an instruction register 110 is decoded, and an index register identifier 101 and a base register identifier 102 are transferred to the GPR 120. The GPR (general-purpose register) 120 is constructed of, for example, 16 general-purpose register groups, to which identifier numbers from 0 to 15 have been allocated respectively. Then, the GPR 120 selects the general-purpose register having such an identification number corresponding to the index register identifier 101, and transfers the content of the selected general-purpose register to the AND circuit 121 as the content of the index register. Also, the GPR 120 selects the general-purpose register corresponding to the base register identifier 102, and then transfers the content of this selected general-purpose register to the AND circuit 122 as the content of the base register.

The zero detecting circuit 111 detects "0" of the index register identifier 101, brings the control signal 112 to an ON state when the index register identifier 101 corresponds to "0", and brings the control signal 112 to on OFF state when the index register identifier 101 becomes values other than "0". Further, the zero detecting circuit 111 executes the zero detection of the base register identifier 102, brings the control signal 113 to the ON state when the base register identifier 102 becomes "0", and brings the control signal 113 to the OFF state when the base register identifier 102 becomes values other than "0".

As a consequence, the AND circuit 121 outputs the data of an all-zero output when the control signal 112 is under the ON state, namely the index register identifier 101 becomes "0", whereas the AND circuit 121 outputs the content of the index register when the control signal 112 is under OFF state, namely the index register identifier 101 becomes the values other than "0".

Also, the AND circuit 122 outputs data of an all-zero output, when the control signal 113 is under the ON state, namely the base register identifier 102 becomes "0", and outputs the content of the base register when the control signal 113 is under the OFF state, namely the base register identifier 102 becomes the value other than "0".

As a result, when the 0th general-purpose register is designated as the index register and the base register, the data of an all-zero output are transferred to the address adder 130, the OR circuit 190, and the selection controlling circuit 194 irrelevant of the content of the 0th general-purpose register.

Normally, in such a sort of processing, when the index register identifier 101 and the base register identifier 102 become "0", the contents of the registers are not used so as to generate the address. It is feasible that such a fact happens to occur in forming a software that the number for either the index register or the base register in the second operand of the instruction becomes zero. To utilize the characteristics of such a process, the present invention executes the zero detections of the above-described identifiers and the process operations related to the zero detections.

In the succeeding machine cycle for generating the logical address, the following process operations will be performed.

The output from the AND circuit 121, the output from the AND circuit 122, and the displacement bits 103 are added by the address adder 130 to obtain a logical address containing the page address 132 and the page offset 133, and then stores this logical address to the logical address register 140. The page address portion of the output from the AND circuit 121 and the page address portion of the output from the AND circuit 122 are ORed by the OR gate 190, and the resultant gated output is transferred to the selecting circuit 191.

On the other hand, the selection controlling circuit 194 controls the selecting circuit 191 and the selecting circuit 192 based upon the page address portion of the output from the AND circuit 121 and the page address portion of the output from the AND circuit 122. Concretely speaking, the selection controlling circuit 194 brings the control signal 195 to the ON state under such a condition that at least one bit not equal to "0" is present in the page address portion of the output from the AND circuit 121, and also at least one bit not equal to "0" is present at the page address portion of the output from the AND circuit 122, and also brings the control signal 195 into the OFF state in such a case other than the above-described condition.

Accordingly, the selecting circuit 191 selects the page address 141 of the logical address register 140 obtained from the address adder 130 when the control signal 195 is under the ON state, and selects the output from the OR circuit 190 when the control signal 195 is under the OFF state. Furthermore, the selecting circuit 192 selects the page offset 142 of the logical address register 140 when the control signal 195 is under the ON state, and selects the page offset 133 which has been obtained from the address adder 130 at the earlier stage when the control signal 195 is under the OFF state.

Also, the adding circuit 197 adds 1 to the output of the selecting circuit 191 and obtains the next page address of the output of the selecting circuit 191.

Furthermore, the first TLB (translation lookaside buffer) 150 retrieves the page address portion of the real address corresponding to the logical address based upon the output from the selecting circuit 191 as the key, whereas the second TLB 151 retrieves the page address portion of the real address corresponding to the logical address based on the output of the adding circuit 197, namely the next page address of the output of the selecting circuit 191 as the key.

Since a detailed explanation about the TLB retrieval is not directly related to the technical spirit and scope of the present invention, no further description is made in the following specification.

The selection controlling circuit 194 controls the selecting circuit 193 based on the page address portion of the output of the AND circuit 121, the page address portion of the AND circuit 122, and the Carry 131. Concretely speaking, the selecting circuit 194 sets the control signal 196 to the ON state when the Carry 131 becomes "0", sets the control signal 196 to the ON state under such a condition that at least one bit not equal to "0" is present at the page address portion of the output from the AND circuit 121 and at least one bit not equal to "0" is present at the page address portion of the output from the AND circuit 122, and further sets the control signal 196 to the OFF state under other cases than the above-described circumstances.

As a result, the selecting circuit 193 selects the retrieval result of the first TLB 150 when the control signal 196 is under the ON state, and selects the retrieval result of the second TLB 151 when the control signal 196 is under the OFF state. Both of the output from the selecting circuit 193 and the output from the selecting circuit 192 are stored into the real address register 160.

The information processing apparatus according to the preferred embodiment of the present invention utilizes such a fact that when the index register identifier 101 corresponds to "0th", or the bits of the page address portion within the index register correspond to "0s", the page address 141 is equal to either the output of the OR circuit 190, or the subsequent page address, and when the base register identifier 102 corresponds to "0th", or the bits of the page address portion within the base register correspond to "0s", the page address 141 is equal to the content of the page address portion of the index register, namely either the output of the OR circuit 190, or the subsequent page address. Then, when this condition can be satisfied, the retrieving operation of the TLB is carried out at the same time when the address addition is performed.

As a consequence, in accordance with the preferred embodiment of the present invention, the real address can be defined by the machine cycle for generating the logical address.

It should be noted in the foregoing description that since the data of an all-zero output are assured at either the output from the AND circuit 121, or the output from the AND circuit 122, which corresponds to the readout result from the general-purpose register when the register identifier becomes "0th", there is no problem that the data to be inputted into the selecting circuit 191 is to employ an ORing result between the output of the AND circuit 121 and the output of the AND circuit 122.

In case that at least one bit not equal to "0" is present at the page address portion within the index register, and also at least one bit not equal to "0" is present at the page address portion within the base register, since the page address portion of the logical address is not known until the address adding operation is completed, both of the address adding operation and the TLB retrieving operation are performed in a serial manner, and the real address is defined by utilizing two machine cycles.

In this case, since the address adder 130 and the logical address register 140 are not used in the machine cycle of the TLB retrieval for this instruction, the address adding operation for the next instruction may be executed.

The below-mentioned process will now be executed in the machine cycle for the next cache memory retrieving operation.

The cache memory apparatus 170 retrieves a cache directory 172 by way of the real address register 160, and judges whether or not the data demanded by the instruction is present in the cache memory 171. If the data is not located within the cache memory 171, the cache memory apparatus 170 does not directly retrieve the cache memory 171, and transfers the demanded data to another independent mechanism in which this demanded data is retrieved. To the contrary, if there is the demanded data in the cache memory 171, then the cache memory apparatus 170 accesses the cache memory 171 based upon the real address, and transfers the data demanded by the instruction to the ALU 180.

In the next machine cycle of the calculation execution, the ALU 180 performs the calculation based upon the data which has been transferred from the cache memory apparatus 170.

Referring now to FIG. 5, a flow of an instruction in the above-described information processing apparatus according to this preferred embodiment of the present invention will be described. In FIG. 5, an abscissa represents a temporal (time) direction, and each of the abbreviation letters corresponds to the following: "D"—instruction decoding machine cycle; "A"—logical address generating machine cycle; "T"—TLB retrieving machine cycle; "B"—cache memory retrieving machine cycle; and, "E"—calculation executing machine cycle.

In FIG. 5, an instruction 1 and an instruction 2 correspond to such a case that a page address portion of a logical address is previously known from the page address portion of either the index register, or the base register, and then both of the logical address generation machine cycle and the TLB retrieval machine cycle can be executed within the same machine cycle. An instruction 3 corresponds to such a case that a page address portion of a logical address is not known until the address addition is ended. In this case, both the logical address generation machine cycle and the TLB retrieval machine cycle are executed in a serial form.

In the TLB retrieval machine cycle of the instruction 3, since no address adder is used, the address adding process and the TLB retrieval process can be independently operated, and the address adding operation of the instruction 4 can be performed. In other words, even when the logical address generation machine cycle and the TLB retrieval machine cycle would be executed in a serial form, there is no delay in the logical address generation machine cycle of the instruction 4.

As previously described in detail, according to the preferred embodiment of the present invention, when the page address portion of either the index register, or the base register is equal to the page address portion of the logical address, otherwise when the subsequent page address of the page address portion of either the index register, or the base register is equal to the page address portion of the logical address, both of the address adding operation and the TLB retrieving operation can be performed at the same time, and therefore time required for defining the real address can be shortened by 1 machine cycle.

Also, in accordance with the above-described information processing apparatus of the preferred embodiment of the present invention, even when such instructions that the page address portions of the logical addresses are not known are continued, since the machine cycle required for the address adding operation, and the machine cycle required for the TLB retrieving operation can be independently operated, there is no actual delay in the processing operation.

What is claimed is:

1. A memory access system defining an address at an earlier stage, comprising:

a register means for holding an inputted instruction, for supplying a selection signal and outputting a content of a general-purpose register whose identifier is not equal to zero, and for outputting an all-zero output signal instead of a content of a general-purpose register whose identifier is equal to zero when either a base register identifier used to identify said general-purpose register or an index register identifier used to identify said general-purpose register, which are contained in said instruction, is zero;

a logical address means connected to said register means, for generating and holding a logical address having a page address and a page offset based upon an output derived from said register means and displacement bits derived therefrom in response to the contents indicated by said base register identifier and said index register identifier;

a selecting means connected to said register means and said logical address means, for selecting one of a content of said base register, a content of said index register, and said page address given from said logical address means; and an access means connected to said selecting means, receiving a selected output from said selecting means for accessing a real address corresponding to said output from a predetermined relation, and for accessing a memory.

2. A memory address system as claimed in claim 1, further comprising:

a first AND gating means connected between said register means and said logical address means, for ANDing a content of said general-purpose register identifying said base register identifier with a first all-zero output signal indicating that said base register identifier becomes zero, and a second AND gating means connected between said register means and said logical address means, for ANDing a content of said general-purpose register identified by said index register identifiers with a second all-zero output signal indicating that said index register identifier becomes zero.

3. A memory address system as claimed in claim 1, wherein said access means includes:

an adding means for forming a modified output by adding 1 to the selected output from said selecting means; and a retrieving means for retrieving a real address corresponding to the modified output of said adding means.

4. A memory address system as claimed in claim 3, wherein said logical address means includes an address adder for adding said output with said displacement bits, which have been supplied from said register means in response to said content indicated by said base register identifier and said index register identifier, and for producing a carry signal when a carry signal generated from the most significant bit of said displacement bit appears; and said selecting means selects said access means for accessing a memory when said carry signal is received and a value of which is equal to zero, and when each of said first and second ANDed outputs from said first and second AND gating means has one non-zero bit, and selects said retrieving means in such a case other than the above-described conditions.

5. An information processing apparatus for accessing a cache memory by defining an address at an earlier stage, comprising:

an instruction register for holding a base register identifier, an index register identifier, and displacement bits;

a general-purpose register connected to said instruction register, for holding a content of a base register and a content of an index register, which have been designated by said base register identifier and said index register identifier;

a logical address generator connected to said general-purpose register, for generating a logical address having both of a page address and a page offset based upon contents of said base register and said index register and said displacement bits;

a logical address register connected to said logical address generator, for holding said page address and said page offset of said logical address;

a selection controller for supplying a selection signal when any one of contents of said base register and also said index register corresponds to zero:

a selecting circuit connected to said general purpose register and said logical address register, for supplying a selected one of a first output of said logical address generator and a second output of said general-purpose register in response to said selection signal derived from said selection controller;

a translation look aside buffer connected to said selecting circuit, for receiving a selected output of said selecting circuit to supply a real address corresponding to said selected output of said selecting circuit; and a cache memory means connected to said translation look aside buffer, for performing a memory access based on said real address.

6. An information processing apparatus as claimed in claim 5, further comprising:

a first AND gating means connected between said general-purpose register and said logical address generator, for AND-gating said contents of said general-purpose register identifying said base register identifier with a first all-zero output signal indicating that said base register identifier is equal to zero; and a second AND gating means connected between said general-purpose register and said logical address generator, for AND-gating said contents of said general-purpose register identifying said index register identifier with a second all-zero output signal indicating that said index register identifier is equal to zero.

7. An information processing apparatus as claimed in claim 5, wherein said retrieving means includes:

an adding means for accepting said selected output from the selecting circuit and for adding 1 to said selected output from the selecting circuit to form a modified output; and a retrieving means for retrieving a real address corresponding to said modified output of said adding means.

8. An information processing apparatus as claimed in claim 7, further comprising:

an address adder for adding said displacement bits to said output, which have been supplied from said general-purpose register in accordance with said contents indicated by said base register identifier and said index register identifier, and for producing a carry signal when a carry signal generated from the most significant bit of said displacement bits appears; and controlling means for selecting said cache memory means to access a memory in response to said carry signal when the value of said carry signal is equal to zero, and each of said first and second ANDed outputs from said first and second AND gating means has at least one non-zero bit, and for selecting said retrieving means under such a case other than the preceding case.

9. A method for performing a memory access defining an address at an earlier stage, in an arrangement having an instruction register, a general-purpose register, an address adder, and a translation look aside buffer, said method comprising the steps of:

holding an inputted instruction in said instruction register, supplying a selection signal and outputting a content of the general-purpose register whose identifier is not zero, and outputting an all-zero output signal instead of said content of said general-purpose register whose identifier is equal to zero when either a base register identifier used to identify said general-purpose register or an index register identifier used to identify said general-purpose register, which are contained in said instruction, is zero;

generating and holding a logical address having a page address and a page offset in said address adder, based upon the output supplied from said outputting step and said displacement bits derived in accordance with the contents indicated by said base register identifier and said index register identifier;

selecting any one of a content of a base register, a content of an index register, and said page address supplied from said generating step in response to said selection signal; and receiving an output of said selecting step to access a real address corresponding to said output from a predetermined relation, and executing a memory access.

10. An information processing apparatus comprising:

an instruction register for receiving a base register identifier, an index register identifier, and displacement bits;

general-purpose registers, connected to said instruction register with each general-purpose register being selectively useable as a base register and an index register as designated by said base register identifier and said index register identifier;

a logical address adder connected to said general purpose registers for generating a logical address having a page address portion and a page offset portion based on a content of a base register and displacement bits designated by an instruction received by said instruction register;

a logical address register for storing the logical address generated by said logical address adder;

a translation look-aside buffer for selecting a real address corresponding to the logical address;

a real address register for storing said real address obtained by said translation look-aside buffer; and a first selecting unit for selecting one of a page address of said base register, a page address of said index register, and a page address of said logical address register, whereby said translation look-aside buffer selects a real address in accordance with a selection result of said first selecting unit.

11. An information processing apparatus as claimed in claim 10, wherein said first selecting unit is controlled based upon said index register identifier, said base register identifier, and a result obtained by said logical address adder during generation of said logical address.

12. An information processing apparatus as claimed in claim 10, wherein said first selecting unit is controlled based upon the content of said index register, the content of said base register, and a result obtained by said logical address adder during generation of said logical address.

13. An information processing apparatus as claimed in claim 10, further comprising:

a cache memory for retrieving stored data based upon a page address of said real address register and a page offset of said logical address register.

* * * * *